(12) United States Patent
Asterjadhi et al.

(10) Patent No.: US 12,245,082 B2
(45) Date of Patent: *Mar. 4, 2025

(54) FLEXIBLE NEGOTIATION OF PARAMETERS IN SETUP EXCHANGES FOR WIRELESS COMMUNICATION SESSIONS

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Yongchun Xiao, Fremont, CA (US); Srinivas Katar, Fremont, CA (US); Sandip Homchaudhuri, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,246

(22) Filed: Jun. 28, 2023

(65) Prior Publication Data

US 2023/0345306 A1    Oct. 26, 2023

Related U.S. Application Data

(63) Continuation of application No. 16/926,170, filed on Jul. 10, 2020, now Pat. No. 11,729,670.

(60) Provisional application No. 62/893,147, filed on Aug. 28, 2019.

(51) Int. Cl.
*H04W 28/18* (2009.01)
*H04W 28/06* (2009.01)
*H04W 52/02* (2009.01)
*H04W 72/0446* (2023.01)
*H04W 76/10* (2018.01)

(52) U.S. Cl.
CPC .......... *H04W 28/18* (2013.01); *H04W 28/06* (2013.01); *H04W 52/0216* (2013.01); *H04W 72/0446* (2013.01); *H04W 76/10* (2018.02)

(58) Field of Classification Search
CPC . H04W 28/18; H04W 28/06; H04W 52/0216; H04W 72/0446; H04W 76/10; Y02D 30/70

See application file for complete search history.

(56) References Cited

U.S. PATENT DOCUMENTS

| 10,791,516 | B1 * | 9/2020 | Chu ................. H04W 52/0216 |
| 11,523,306 | B1 | 12/2022 | Chu et al. |
| 11,729,670 | B2 | 8/2023 | Asterjadhi et al. |
| 2006/0215601 | A1 | 9/2006 | Vleugels et al. |
| 2009/0310578 | A1 | 12/2009 | Convertino et al. |

(Continued)

FOREIGN PATENT DOCUMENTS

WO    2007000720 A1    1/2007

*Primary Examiner* — Michael K Phillips
(74) *Attorney, Agent, or Firm* — Patterson & Sheridan LLP

(57) ABSTRACT

Certain aspects of the present disclosure provide techniques that may allow a device participating in a setup procedure to efficiently propose a range of values for a negotiated parameter. The techniques may reduce setup time, for example, allowing a responder to accept a value within the proposed range which may eliminate overhead associated with some of the back and forth message exchange of typical negotiations.

30 Claims, 8 Drawing Sheets

(56) References Cited

U.S. PATENT DOCUMENTS

| | | | |
|---|---|---|---|
| 2014/0122732 A1* | 5/2014 | Duan | H04L 67/14 |
| | | | 709/228 |
| 2014/0169339 A1 | 6/2014 | Cheng et al. | |
| 2015/0359008 A1 | 12/2015 | Wang et al. | |
| 2016/0219512 A1 | 7/2016 | Asterjadhi et al. | |
| 2018/0192444 A1* | 7/2018 | Park | H04W 74/0833 |
| 2018/0332534 A1 | 11/2018 | Hou et al. | |
| 2019/0239226 A1* | 8/2019 | Chu | H04L 5/0037 |
| 2020/0374802 A1* | 11/2020 | Chu | H04W 52/0216 |
| 2021/0029750 A1 | 1/2021 | Xin et al. | |
| 2021/0068008 A1 | 3/2021 | Asterjadhi et al. | |
| 2021/0099955 A1* | 4/2021 | Kim | H04W 52/0229 |

* cited by examiner

| Order | Information |
|---|---|
| 1 | Category |
| 2 | Unprotected S1G Action |
| 3 | Dialog Token |
| 4 | One or more TWTs (TWT elements) |

FIG. 8

FLEXIBLE NEGOTIATION OF PARAMETERS IN SETUP EXCHANGES FOR WIRELESS COMMUNICATION SESSIONS

CROSS REFERENCE TO RELATED APPLICATION

This Application is a continuation of U.S. patent application Ser. No. 16/926,170, filed Jul. 10, 2020, which hereby claims priority under 35 U.S.C. § 119 to U.S. Provisional Patent Application No. 62/893,147, filed on Aug. 28, 2019, the contents of which are incorporated herein in their entireties.

BACKGROUND

Field of Disclosure

Certain aspects of the present disclosure generally relate to wireless communications and, more particularly, to techniques for negotiating values for parameters in wireless communication sessions.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that communicates with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include secure transmission of video data between wireless nodes in a wireless network.

Certain aspects of the present disclosure provide a method of wireless communications by a first wireless node. The method generally includes generating a first frame with at least first and second elements that each include at least a first field that corresponds to a first parameter being negotiated by the first wireless node with a second wireless node for a first communication session, indicating a first range of values for the first parameter by setting the first field to a first value in the first element and setting the first field to a second value in the second element, and outputting the first frame for transmission to the second wireless node.

Certain aspects of the present disclosure provide a method of wireless communications by a first wireless node. The method generally includes obtaining, from a second wireless node, a first frame with at least first and second elements that each include at least a first field corresponding to at least a first parameter being negotiated by the first wireless node with the second wireless node for a first communication session, determining a first range of values proposed by the first wireless node for the first parameter based on a first value of the first field in the first element and a second value of the first field in the second element, generating a second frame that indicates: an accepted value for the first parameter selected from within the first range, a range of values proposed by the second wireless node for the first parameter, or a proposed value for the first parameter that is outside of the first range, and outputting the second frame for transmission to the second wireless node.

Certain aspects of the present disclosure provide an apparatus of wireless communications by a first wireless node. The apparatus generally includes means for generating a first frame with at least first and second elements that each include at least a first field that corresponds to a first parameter being negotiated by the first wireless node with a second wireless node for a first communication session; means for indicating a first range of values for the first parameter by setting the first field to a first value in the first element and setting the first field to a second value in the second element; and means for outputting the first frame for transmission to the second wireless node.

Certain aspects of the present disclosure provide an apparatus of wireless communications by a first wireless node. The apparatus generally includes means for obtaining, from a second wireless node, a first frame with at least first and second elements that each include at least a first field corresponding to at least a first parameter being negotiated by the first wireless node with the second wireless node for a first communication session; means for determining a first range of values proposed by the first wireless node for the first parameter based on a first value of the first field in the first element and a second value of the first field in the second element; means for generating a second frame that indicates: an accepted value for the first parameter selected from within the first range, a range of values proposed by the second wireless node for the first parameter, or a proposed value for the first parameter that is outside of the first range; and means for outputting the second frame for transmission to the second wireless node.

Certain aspects of the present disclosure provide an apparatus of wireless communications by a first wireless node. The apparatus generally includes a processing system configured to generate a first frame with at least first and second elements that each include at least a first field that corresponds to a first parameter being negotiated by the first wireless node with a second wireless node for a first communication session and indicate a first range of values for the first parameter by setting the first field to a first value in the first element and setting the first field to a second value in the second element; and an interface configured to output the first frame for transmission to the second wireless node.

Certain aspects of the present disclosure provide an apparatus of wireless communications by a first wireless node. The apparatus generally includes an interface configured to obtain, from a second wireless node, a first frame with at least first and second elements that each include at
} least a first field corresponding to at least a first parameter being negotiated by the first wireless node with the second wireless node for a first communication session; and a processing system configured to determine a first range of values proposed by the first wireless node for the first parameter based on a first value of the first field in the first element and a second value of the first field in the second element and generate a second frame that indicates an accepted value for the first parameter selected from within the first range, a range of values proposed by the second wireless node for the first parameter, or a proposed value for the first parameter that is outside of the first range, wherein the interface is further configured to output the second frame for transmission to the second wireless node.

Certain aspects of the present disclosure provide a first wireless node. The first wireless node generally includes a receiver to obtain, from a second wireless node, a first frame with at least first and second elements that each include at least a first field corresponding to at least a first parameter being negotiated by the first wireless node with the second wireless node for a first communication session; a processing system configured to determine a first range of values proposed by the first wireless node for the first parameter based on a first value of the first field in the first element and a second value of the first field in the second element and generate a second frame that indicates: an accepted value for the first parameter selected from within the first range, a range of values proposed by the second wireless node for the first parameter, or a proposed value for the first parameter that is outside of the first range; and a transmitter configured to transmit the second frame to the second wireless node.

Certain aspects of the present disclosure provide a first wireless node. The first wireless node generally includes a processing system configured to generate a first frame with at least first and second elements that each include at least a first field that corresponds to a first parameter being negotiated by the first wireless node with a second wireless node for a first communication session and indicate a first range of values for the first parameter by setting the first field to a first value in the first element and setting the first field to a second value in the second element; and a transmitter configured to transmit the first frame to the second wireless node.

Certain aspects of the present disclosure provide a computer-readable medium for wireless communications. The computer-readable medium generally includes codes executable to generate a first frame with at least first and second elements that each include at least a first field that corresponds to a first parameter being negotiated by a first wireless node with a second wireless node for a first communication session, indicate a first range of values for the first parameter by setting the first field to a first value in the first element and setting the first field to a second value in the second element and output the first frame for transmission to the second wireless node.

Certain aspects of the present disclosure provide a computer-readable medium for wireless communications. The computer-readable medium generally includes codes executable to obtain, from a second wireless node, a first frame with at least first and second elements that each include at least a first field corresponding to at least a first parameter being negotiated by a first wireless node with the second wireless node for a first communication session; determine a first range of values proposed by the first wireless node for the first parameter based on a first value of the first field in the first element and a second value of the first field in the second element; generate a second frame that indicates: an accepted value for the first parameter selected from within the first range, a range of values proposed by the second wireless node for the first parameter, or a proposed value for the first parameter that is outside of the first range; and output the second frame for transmission to the second wireless node.

Aspects of the present disclosure also provide various apparatus, means, and computer program products corresponding to the methods and operations described above.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates an example frame format for specifying a range of values for a negotiated parameter, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
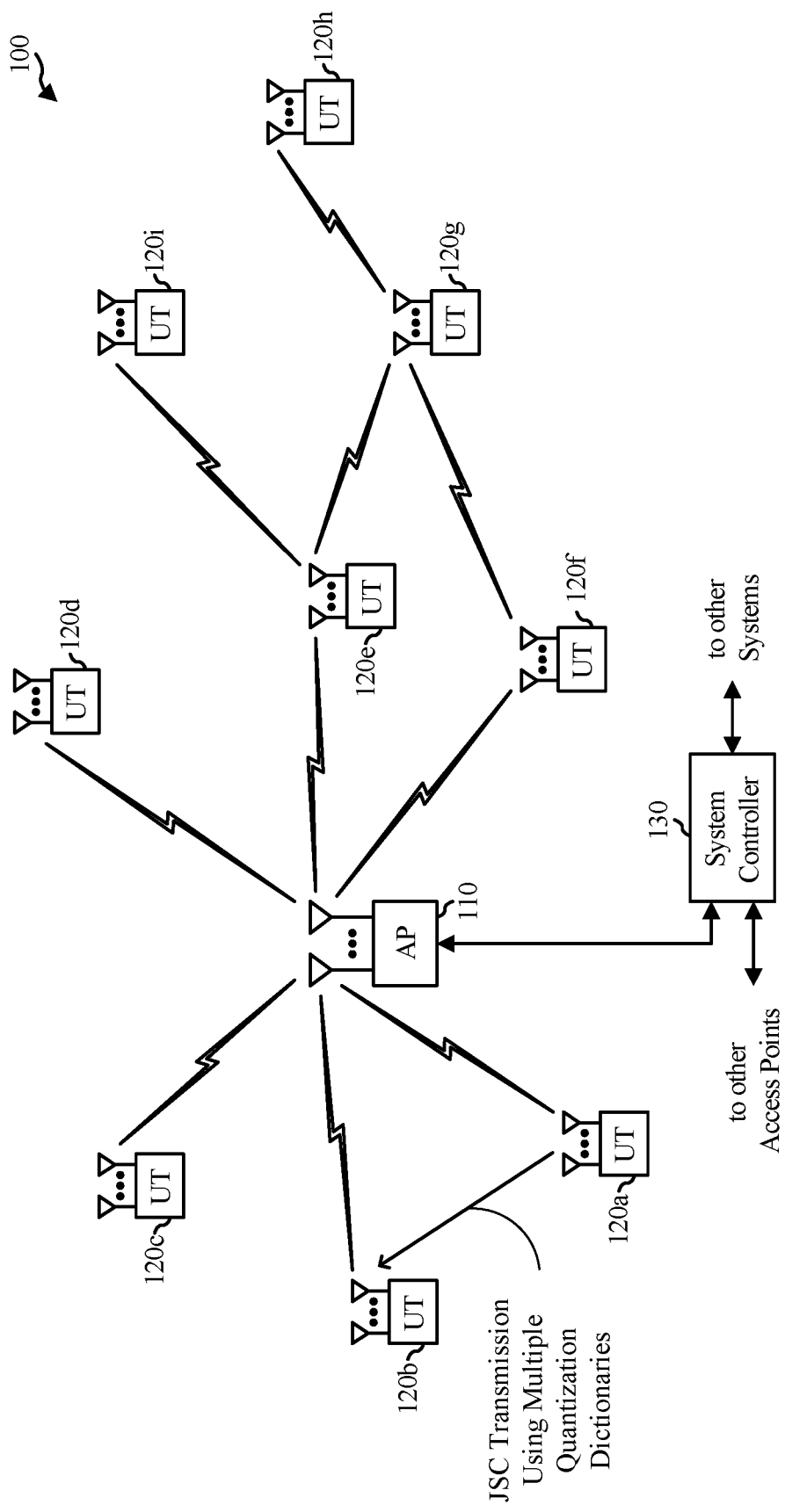
FIG. 1 is a diagram of an example wireless communications network, in accordance with certain aspects of the present disclosure.

Certain aspects of the present disclosure provide techniques that may allow a device participating in a setup procedure to efficiently propose a range of values for a negotiated parameter. The techniques may reduce setup time, for example, allowing a responder to accept a value within the proposed range which may eliminate overhead associated with some of the back and forth message exchange of typical negotiations.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem (such as an AR/VR console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communication System

FIG. 1 illustrates an example multiple-access multiple-input multiple-output (MIMO) system 100 (e.g., 802.11ad, 802.11ax, 802.11 ay, 802.11az, 802.11be, LTE, or NR wireless communication systems), in which aspects of the present disclosure may be practices. For example, user terminals 120 and access points 110 may perform operations of FIG. 3 and FIG. 4 (described in greater detail below) to negotiate values for parameters used during a communications session.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
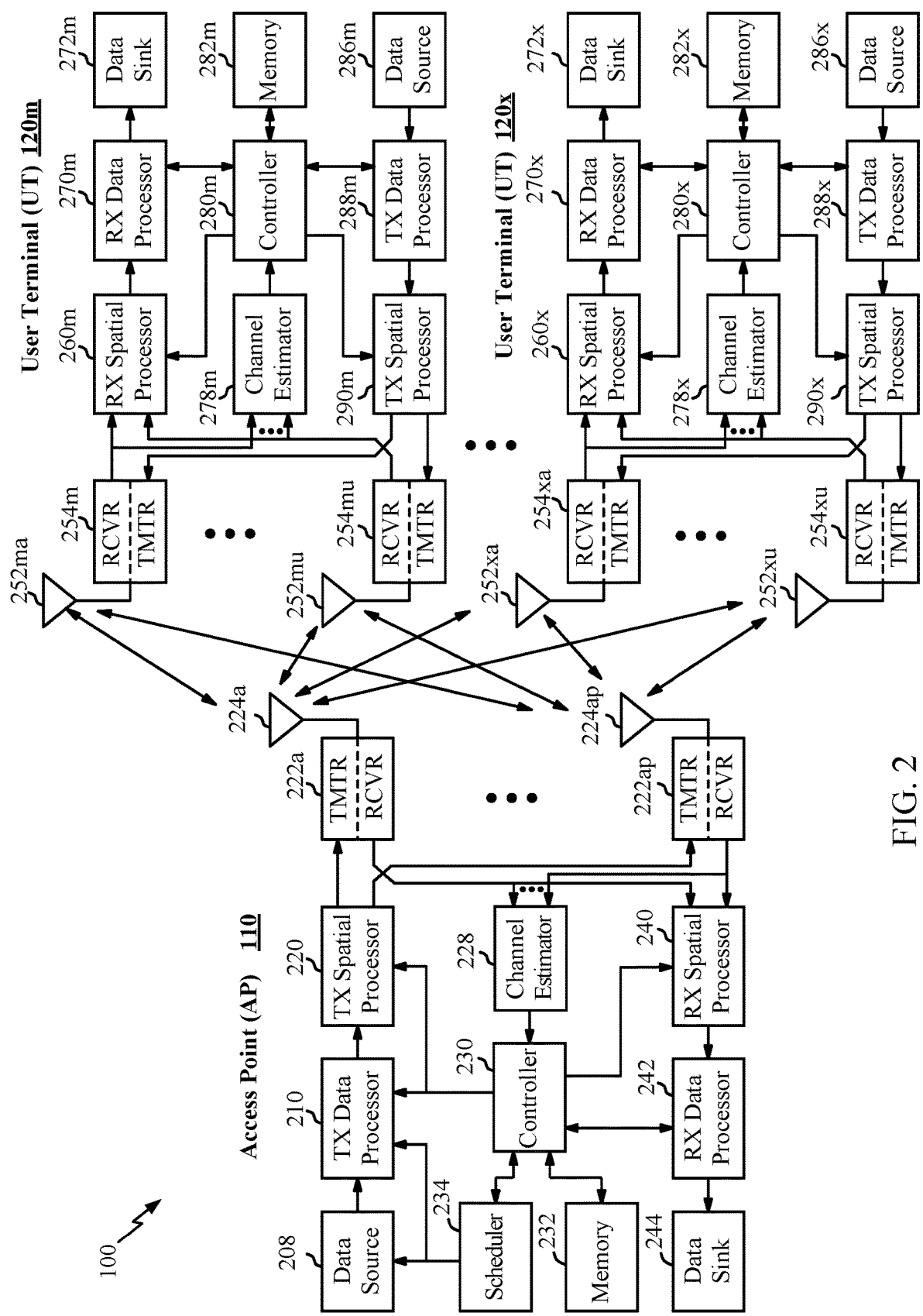
FIG. 2 is a block diagram of an example access point and example user terminals, in accordance with certain aspects of the present disclosure.

FIG. 2 illustrates a block diagram of access point 110 and two user terminals 120m and 120x in MIMO system 100, which may be used to implement aspects of the present disclosure. For example, antennas 252 and processors 260, 270, 288 and 290 of the UT 120 and/or antennas 224 and processors 210, 220, 240 and 242 of the access point 110 may be used to perform the various techniques and methods described herein, such as the operations depicted in FIG. 3 and FIG. 4.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ $N_{ap}$ receiver symbol streams from receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Example Flexible Negotiation of Parameters in Setup Exchanges

Currently in typical wireless (e.g., Wi-Fi) networks, devices negotiate values for the various parameters related to setup of communications sessions and operation. Unfortunately, there is currently no efficient mechanism to enable the devices to select from a range of values for one or more parameters pertaining to a particular session or mechanism. As a result, the devices typically exchange messages back and forth until a particular proposed value is agreed upon, resulting in substantial system overhead. Alternatively the session may be rejected or the parameter may be dictated by the responder.

Aspects of the present disclosure, however, provide techniques that enable devices to specify and select from a range of values, which may help eliminate much of the aforementioned overhead associated with typical negotiations. As will be described in greater detail below, a first wireless node (e.g., a requester STA) may include multiple elements, for example, of a same type in frames (e.g., MGMT frames) that they transmit to a second wireless node as part of a setup phase to indicate a range of values for one or more of the parameters being negotiated. In some cases, such frames may include different values to propose ranges for multiple fields. The second wireless node (e.g., the responder) can choose a value for a parameter that falls within the range indicated by the requester STA.

Figure 3:
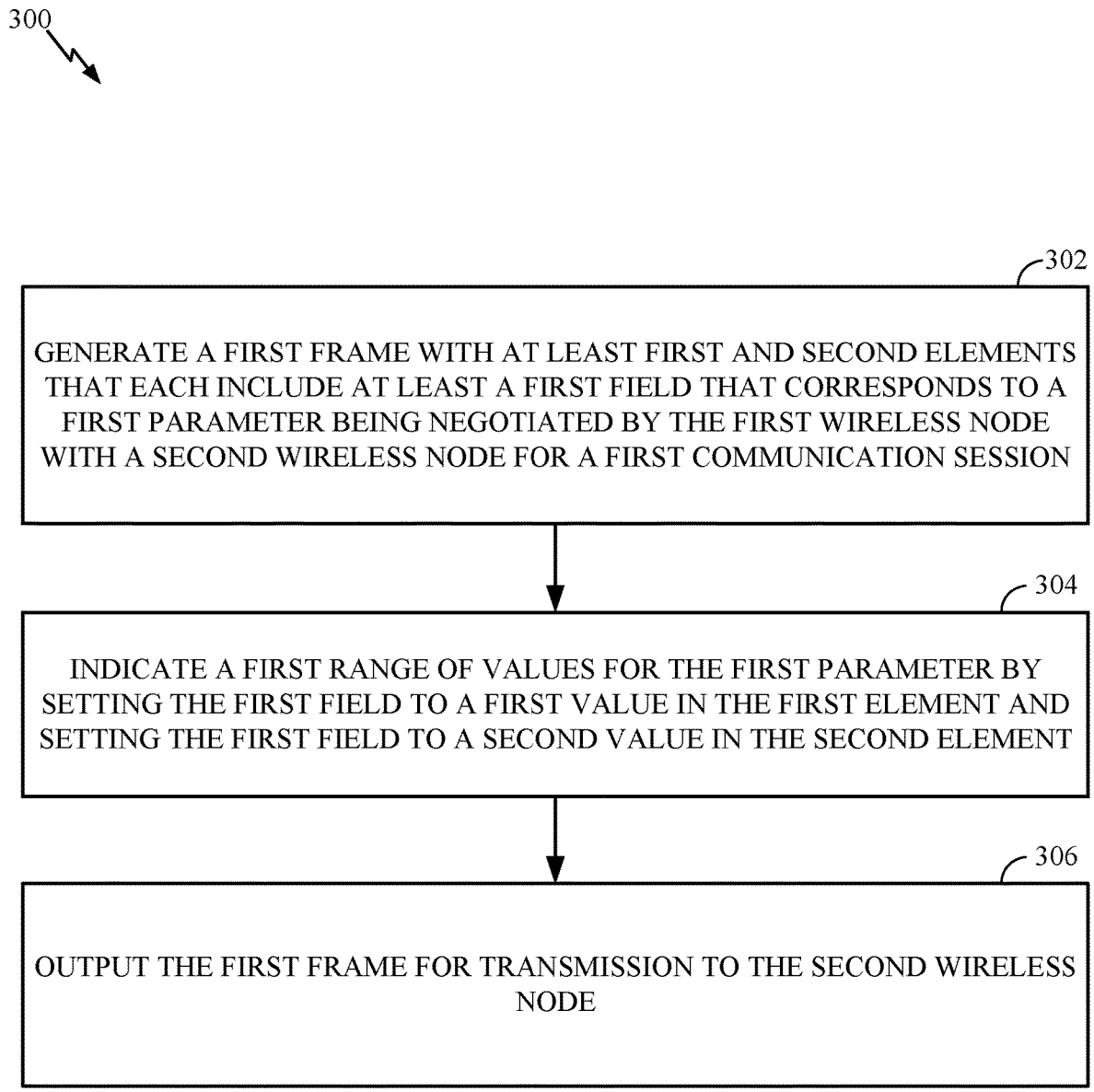
FIG. 3 illustrates example operations for wireless communications by a first wireless node (e.g., a requester), in accordance with certain aspects of the present disclosure.

FIG. 3 illustrates example operations 300 for wireless communications by a first wireless node, in accordance with certain aspects of the present disclosure. Operations 300 may be performed, for example, by a requester (non-AP) STA negotiating parameters for a communication session with a second wireless node (e.g., a responder AP).

Operations begin, at 302, by generating a first frame with at least first and second elements that each include at least a first field that corresponds to a first parameter being negotiated by the first wireless node with a second wireless node for a first communication session. Examples of parameters that may be negotiated include a target wakeup time (TWT) negotiated during a TWT setup exchange, as well as minimum wake duration, triggered TWT, announced TWT, channel of operation (SST), and the like. However, the techniques described herein may be used to efficiently negotiate a variety of different parameters (e.g., during a number of different types of setup exchanges).

At 304, the first wireless node indicates a first range of values for the first parameter by setting the first field to a first value in the first element and setting the first field to a second value in the second element. At 306, the first wireless node outputs the first frame for transmission to the second wireless node.

Figure 4:
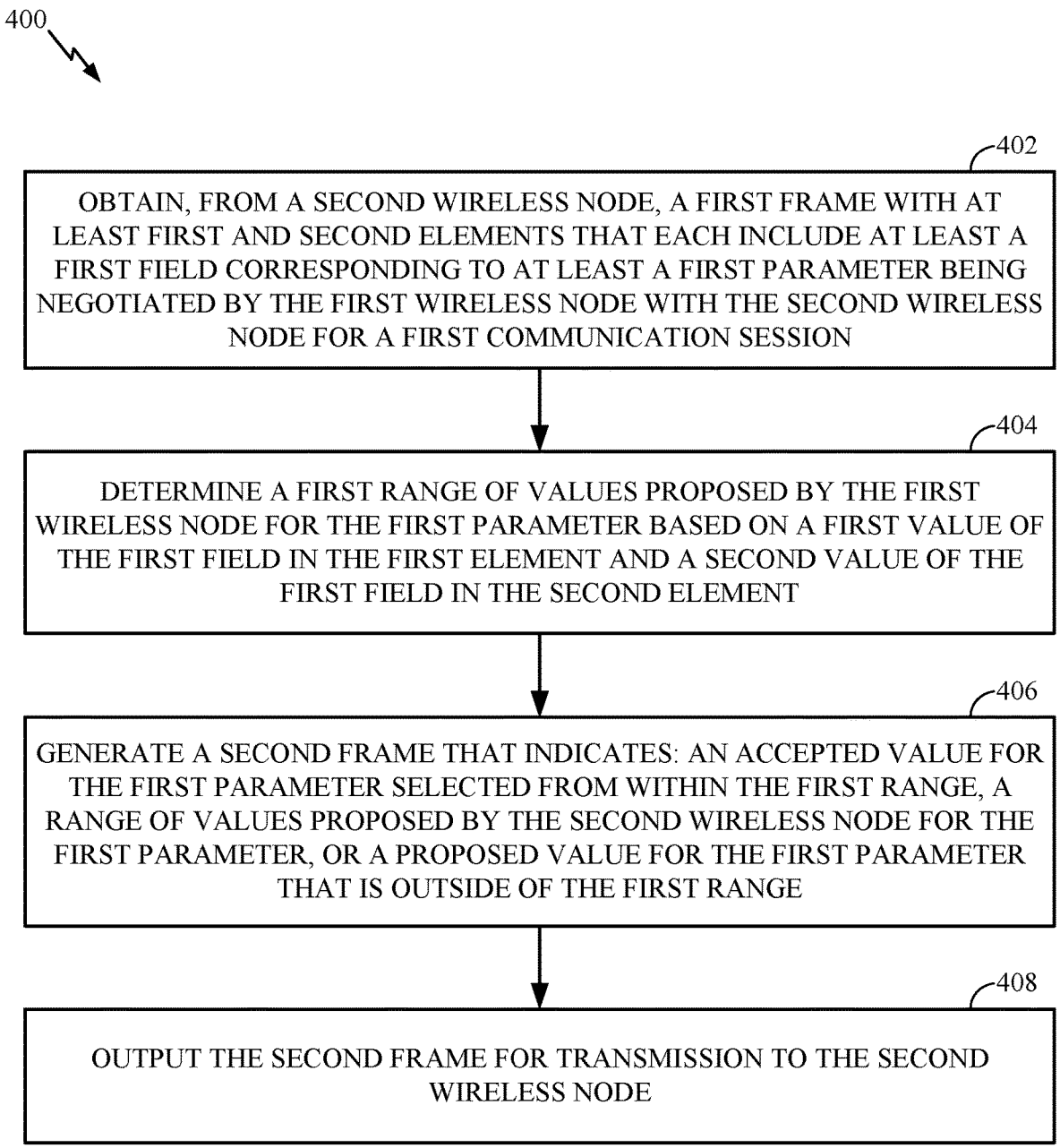
FIG. 4 illustrates example operations for wireless communications by a second wireless node (e.g., a responder), in accordance with certain aspects of the present disclosure.

FIG. 4 illustrates example operations 400 for wireless communications by a second wireless node, in accordance with certain aspects of the present disclosure. Operations 400 may be performed, for example, by a responder STA negotiating parameters for a communication session with a (non-AP) STA performing operations 300 of FIG. 3.

Operations 400 begin, at 402, by obtaining, from a second wireless node, a first frame with at least first and second elements (or fields) that each include at least a first field corresponding to at least a first parameter being negotiated by the first wireless node with the second wireless node for a first communication session.

At 404, the second wireless node determines a first range of values proposed by the first wireless node for the first parameter based on a first value of the first field in the first element and a second value of the first field in the second element.

At 406, the second wireless node generates a second frame that indicates: an accepted value for the first parameter selected from within the first range, a range of values proposed by the second wireless node for the first parameter, or a proposed value for the first parameter that is outside of the first range. In other words, the responder may simply select a value from within the first range (which may be considered an acceptance), may propose a second range different than the range specified in the request (which may be considered a counterproposal, for example, if none of the values within the first range are acceptable by the responder).

At 408, the second wireless node outputs the second frame for transmission to the second wireless node.

Figure 5:
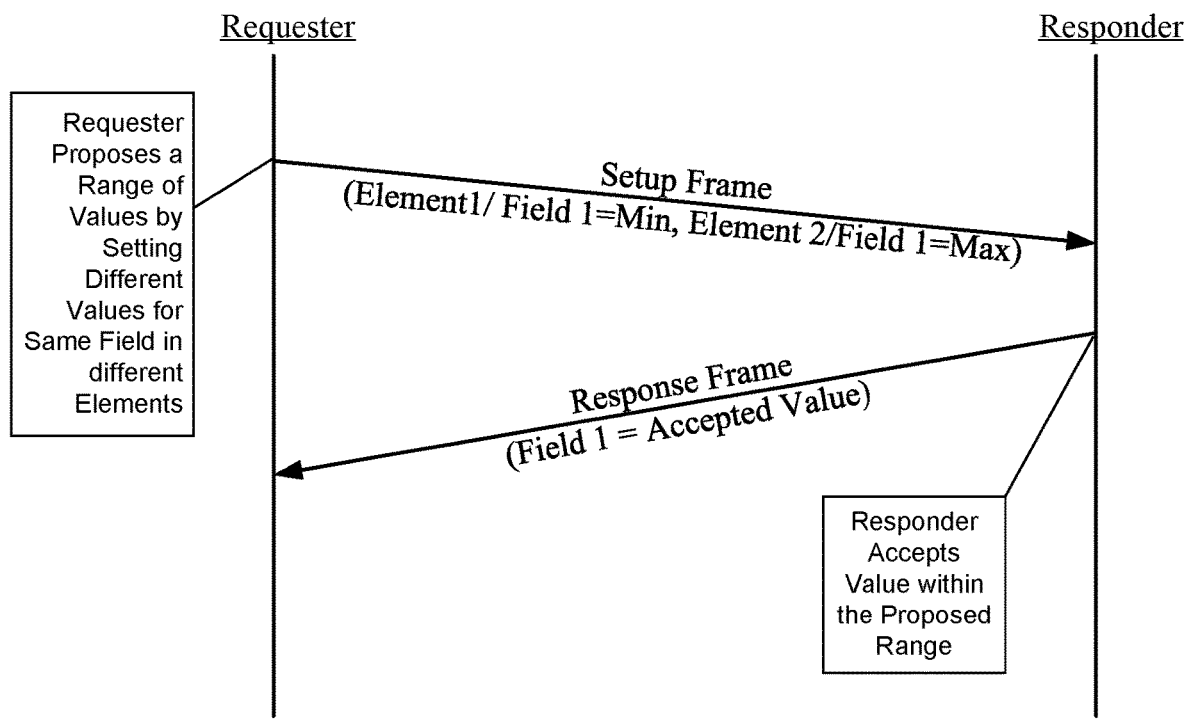
FIG. 5, FIG. 6, and FIG. 7 illustrate example negotiations where a requester specifies a range of values for a negotiated parameter, in accordance with certain aspects of the present disclosure.
Figure 6:
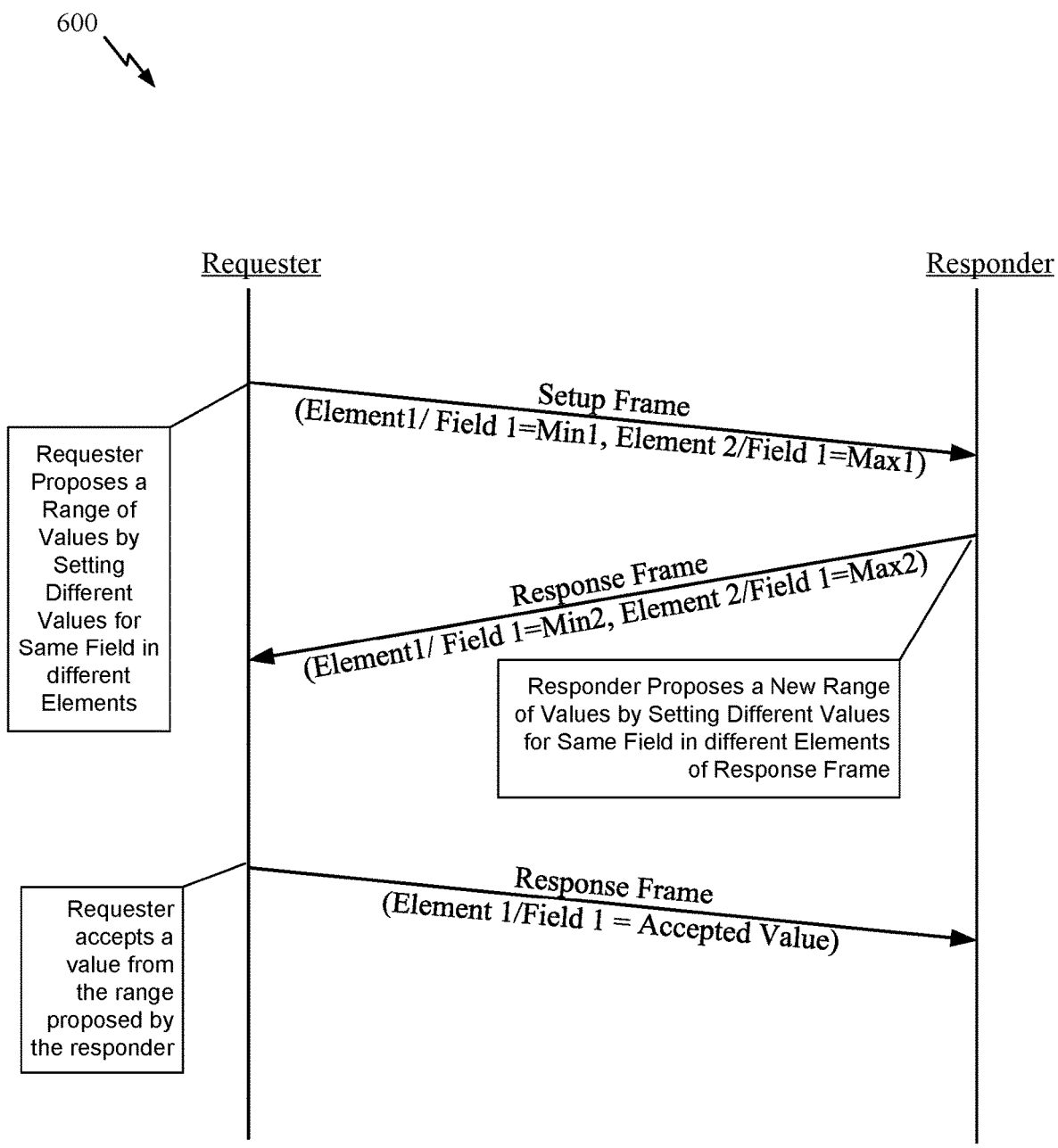
Figure 7:
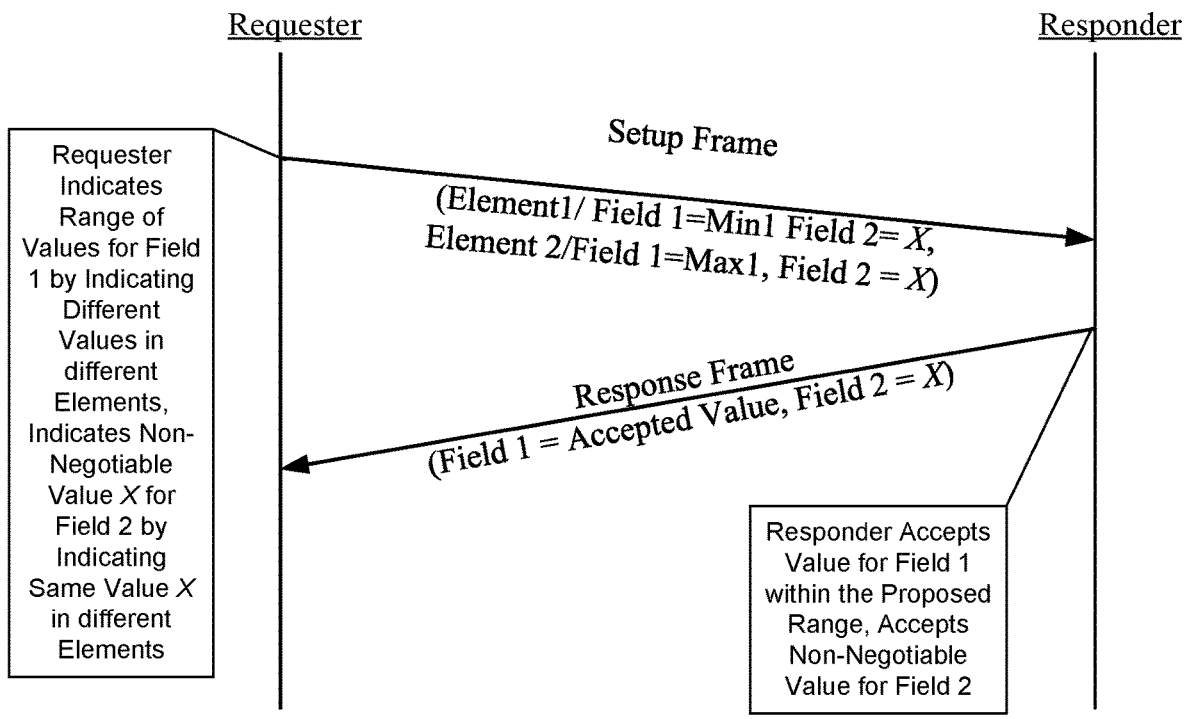

FIG. 5, FIG. 6, and FIG. 7 illustrate example negotiations where a requester specifies a range of values for a negotiated parameter, in accordance with certain aspects of the present disclosure.

As illustrated in FIG. 5, a requester (e.g., a non-AP STA) may send a setup frame, proposing a range of values for a parameter by setting the same field in different elements to different values (e.g., min and max). The responder (e.g., an AP) interprets the different values for the same field (in different elements) to indicate a range. In this example, accepts a value in the range and indicates the accepted value in a response frame (which may have only one element or only one field for the particular parameter).

As illustrated in FIG. 6, in some cases, a responder may propose a new range (different than the range proposed by the requester). By providing a new range, the responder may indicate a narrower (preferred range) or may indicate a range that includes values the requester may not have known were supported. In such cases, the requester may accept a value from within the range proposed by the responder and provide this value in a subsequent request.

In some cases, an AP may advertise (e.g., via a broadcast message) various ranges that are supported so that the STA (wireless device) can know in advance what are acceptable ranges for the AP. In such cases, the range proposed by a requester may be selected based on this advertised ranges.

As illustrated in FIG. 7, in addition (or as an alternative) to proposing a range of values for a parameter, a requester may also indicate a non-negotiable value. In this example, the requester indicates range for a first parameter, but indicates a value for a second parameter is non-negotiable by setting the value for a corresponding field (Field 2) to a same value X in both elements (Element 1 and Element 2). The responder interprets the same value of X for Field 2 in both elements as indicating a non-negotiable value. As illustrated, the responder may accept a value within the proposed range for Field 1, and may simply accept the non-negotiable value X for Field 2.

Different frame formats may be used to efficiently negotiate parameters for a variety of different types of communications sessions and for different types of mechanisms, in accordance with certain aspects of the present disclosure.

FIG. 8 illustrates an example format for a TWT setup frame that allows for specifying a range of values for a negotiated parameter, in accordance with certain aspects of the present disclosure. A conventional TWT request can provide only a (single) value for each TWT parameter. However, the frame format of FIG. 5 provides the ability to specify a range of values from which the STA can chose to select the TWT parameters.

The TWT Setup frame generally refers to an Action frame that is sent by a STA to request the setup of a TWT session. TWTs are generally used to help minimize contention between clients and reduce the amount of time a client in power save mode needs to be awake. By requesting a particular TWT, a STA may not need to wake up to read a beacon frame, which may result in power savings.

As illustrated, the frame format shown in FIG. 5 may allow for multiple TWT elements allowing a requesting STA to specify a range of values. For example, the station may indicate a range (of proposed TWTs) by setting a TWT field in a first TWT element to a minimum value and setting a TWT field in a second TWT element to a maximum value and a maximum value.

The same type of frame (as shown in FIG. 5) may also be sent by a responding STA to indicate the status of a requested TWT SP. In some cases, the response frame may include a single TWT element indicating an accepted value from within the range indicated in the request (e.g., min≤accepted_value≤max). In other cases, the response frame may include multiple TWT elements, indicating a different range than what was proposed in the request (which may or may not overlap with the range specified by the requester and may be wider or narrower than the range specified by the requester).

In some cases, certain fields of a TWT setup frame may be set to certain values during a negotiation. For example, a TWT Setup frame with a TWT Request field that is equal to 1, the Dialog Token field is set to a nonzero value chosen by the transmitting STA to identify the request/response transaction. In a TWT Setup frame with a TWT Request field equal to 0 that is sent in response to a TWT Setup frame with a TWT Request field that is equal to 1, the Dialog Token field is set to the value copied from the corresponding received TWT Setup frame with a TWT Request field equal to 1. In a TWT Setup frame with a TWT Request field set to 0 that is not sent in response to a TWT Setup frame with a TWT Request field equal to 1, the Dialog Token field is set to 0.

In some cases, one or more TWT elements are present in a TWT Setup frame with a TWT Request field that is equal to 1. One TWT element is present in a TWT Setup frame with a TWT Request field that is equal to 0. If more than one TWT element is present then the first TWT element contains the requested TWT parameters, and the multiple TWT elements provide a range, between a minimum and a maximum value, of TWT parameters, from which the TWT responder can choose if the requested TWT parameters cannot be satisfied.

In some cases, the mechanism described herein may be generalized to negotiate parameters for multiple communications sessions. For example, one TWT Setup frame may be used to negotiate parameters for multiple TWT Sessions (e.g., provided multiple TWT elements are supported at both sides and certain rules may be implemented regarding TWT Flow IDs used to identify the different sessions).

The use of a TWT setup frame with multiple TWT elements is just one example of how the mechanism proposed herein may be used to efficiently negotiate values for parameters for various types of sessions and mechanisms.

For example, different types of (management) frames may be defined for different setups that include multiple elements of different types, such as multiple traffic classification (TCLAS) elements, traffic specification (TSPEC) elements, Power Capability elements, wake-up radio (WUR) Mode elements, opportunistic power save (OPS) elements, SST operation elements, Subchannel Selective Transmission (SST) elements, and/or EL operation elements. The mechanisms proposed herein may allow a requesting STA to propose a range of values for parameters carried in such elements.

A TCLAS element generally specifies an information element that contains a set of parameters necessary to identify incoming MSDUs (from a higher layer in all STAs or from the distribution (DS) in an AP) with a particular traffic stream (TS) to which they belong. A TSPEC element from client generally includes parameters such as data rate, packet size, and number of streams. A Power Capability information element may allow a station to report its minimum and maximum transmit power (e.g., in integer units of dBm).

Wake-up Radio (WuR) mechanisms are typically used to reduce the significant energy waste that wireless devices cause during their idle communication mode. WUR setup typically begins when a STA transmits a request frame containing various duty cycle parameters (On Duration, Duty Cycle Period). The mechanism provided herein may allow a requesting STA to propose a range of values for such parameters.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receiver unit 222) or an antenna(s) 224 of the access point 110 or the receiver unit 254 or antenna(s) 252 of the user terminal 120 illustrated in FIG. 2. Means for transmitting or means for outputting may include a transmitter (such as the transmitter unit 222) or an antenna(s) 224 of the access point 110 or the transmitter unit 254 or antenna(s) 252 of the user terminal 120 illustrated in FIG. 2. Means for generating, means for indicating, means for determining, means for participating and means for selecting may include a processing system, which may include one or more processors, such as the RX data processor 242, the TX data processor 210, the TX spatial processor 220, RX spatial processor 240, or the controller 230 of the access point 110 or the RX data processor 270, the TX data processor 288, the TX spatial processor 290, RX spatial processor 260, or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first wireless node, comprising:
    transmitting a first frame to a second wireless node, wherein: the first frame includes a first element and a second element;
        each of the first element and the second element include at least a first field that corresponds to a first parameter being negotiated by the first wireless node with the second wireless node for a target wake time (TWT) session;
        each of the first element and the second element include at least a second field that corresponds to a second parameter being negotiated by the first wireless node with the second wireless node for the TWT session; and
        the first frame indicates:
            one or more first proposed values for the first parameter for the TWT session; and
            one or more second proposed values for the second parameter for the TWT session.

2. The method of claim 1, wherein the one or more first proposed values comprises a first proposed range of values for the TWT session indicated by a first value for the first parameter included in the first field of the first element and a second value for the first parameter included in the first field of the second element.

3. The method of claim 2, wherein the one or more second proposed values comprises a second proposed range of values for the TWT session indicated by a first value for the second parameter included in the second field of the first element and a second value for the second parameter included in the second field of the second element.

4. The method of claim 2, wherein the one or more second proposed values comprises a non-negotiable value for the second parameter indicated by a same value for the second parameter included in the second field of the first element and the second field of the second element.

5. The method of claim 2, further comprising:
    obtaining information regarding one or more proposed ranges for the first parameter supported by the second wireless node; and
    selecting the first proposed range of values based on the information.

6. The method of claim 2, further comprising:
    obtaining a second frame from the second wireless node, the second frame indicating an accepted value for the first parameter from within the first proposed range of values; and
    participating in the TWT session based at least in part on the accepted value for the first parameter.

7. The method of claim 2, further comprising:
    obtaining a second frame from the second wireless node, the second frame indicating a second proposed range of values for the first parameter, different from the first proposed range of values;
    transmitting a third frame indicating an accepted value for the first parameter from within the second proposed range of values; and
    participating in the TWT session based at least in part on the accepted value for the first parameter.

8. The method of claim 2, wherein each of the first and second elements includes a first identifier (ID) identifying the TWT session for which the first parameter is being negotiated.

9. The method of claim 8, wherein the first frame includes at least a third element and a fourth element that are of a same element type as the first element and the second element and include a second ID identifying a second TWT session for which the first parameter is also being negotiated.

10. The method of claim 9, wherein the first frame includes a second proposed range of values for the first parameter for the second TWT session indicated by a third value for the first parameter included in the third element and a fourth value for the first parameter included in the fourth element.

11. The method of claim 1, wherein:
    the first frame comprises a TWT setup frame; and
    the first element and the second element comprise TWT elements.

12. The method of claim 1, wherein the first element and the second element comprise one or more of: a TWT element, a multiple traffic classification (TCLAS) element, a traffic specification (TSPEC) element, a power capability element, a wake-up radio (WUR) mode element, an opportunistic power save (OPS) element, a subchannel selective transmission (SST) operation element, an SST element, or an energy limited (EL) operation element.

13. A first wireless node for wireless communications, comprising:
    one or more processors configured to execute executable instructions stored on one or more memories and cause the first wireless node to:
        transmit a first frame to a second wireless node, wherein:
            the first frame includes a first element and a second element;
            each of the first element and the second element include at least a first field that corresponds to a first parameter being negotiated by the first wireless node with the second wireless node for a target wake time (TWT) session;
            each of the first element and the second element include at least a second field that corresponds to a second parameter being negotiated by the first wireless node with the second wireless node for the TWT session; and
            the first frame indicates:
                one or more first proposed values for the first parameter for the TWT session; and
                one or more second proposed values for the second parameter for the TWT session.

14. The first wireless node of claim 13, wherein the one or more first proposed values comprises a first proposed range of values for the TWT session indicated by a first value for the first parameter included in the first field of the first element and a second value for the first parameter included in the first field of the second element.

15. The first wireless node of claim 14, wherein the one or more second proposed values comprises a second proposed range of values for the TWT session indicated by a first value for the second parameter included in the second field of the first element and a second value for the second parameter included in the second field of the second element.

16. The first wireless node of claim 14, wherein the one or more second proposed values comprises a non-negotiable value for the second parameter indicated by a same value for the second parameter included in the second field of the first element and the second field of the second element.

17. The first wireless node of claim 14, wherein the one or more processors are further configured to cause the first wireless node to:

obtain information regarding one or more proposed ranges for the first parameter supported by the second wireless node; and select the first proposed range of values based on the information.

18. The first wireless node of claim 14, wherein the one or more processors are further configured to cause the first wireless node to:

obtain a second frame from the second wireless node, the second frame indicating an accepted value for the first parameter from within the first proposed range of values; and participate in the TWT session based at least in part on the accepted value for the first parameter.

19. The first wireless node of claim 14, wherein the one or more processors are further configured to cause the first wireless node to:

obtain a second frame from the second wireless node, the second frame indicating a second proposed range of values for the first parameter, different from the first proposed range of values;

transmit a third frame indicating an accepted value for the first parameter from within the second proposed range of values; and participate in the TWT session based at least in part on the accepted value for the first parameter.

20. The first wireless node of claim 14, wherein each of the first and second elements includes a first identifier (ID) identifying the TWT session for which the first parameter is being negotiated.

21. The first wireless node of claim 20, wherein the first frame includes at least a third element and a fourth element that are of a same element type as the first element and the second element and include a second ID identifying a second TWT session for which the first parameter is also being negotiated.

22. The first wireless node of claim 21, wherein the first frame includes a second proposed range of values for the first parameter for the second TWT session indicated by a third value for the first parameter included in the third element and a fourth value for the first parameter included in the fourth element.

23. The first wireless node of claim 13, wherein:
the first frame comprises a TWT setup frame; and
the first element and the second element comprise TWT elements.

24. The first wireless node of claim 13, wherein the first element and the second element comprise one or more of: a TWT element, a multiple traffic classification (TCLAS) element, a traffic specification (TSPEC) element, a power capability element, a wake-up radio (WUR) mode element, an opportunistic power save (OPS) element, a subchannel selective transmission (SST) operation element, an SST element, or an energy limited (EL) operation element.

25. A method for wireless communications by a second wireless node, comprising:

receiving a first frame from a first wireless node, wherein:
the first frame includes a first element and a second element;
each of the first element and the second element include at least a first field that corresponds to a first parameter being negotiated with the first wireless node for a target wake time (TWT) session;
each of the first element and the second element include at least a second field that corresponds to a second parameter being negotiated with the first wireless node for the TWT session; and
the first frame indicates:
one or more first proposed values for the first parameter for the TWT session; and
one or more second proposed values for the second parameter for the TWT session.

26. The method of claim 25, wherein the one or more first proposed values comprises a first proposed range of values for the TWT session indicated by a first value for the first parameter included in the first field of the first element and a second value for the first parameter included in the first field of the second element.

27. The method of claim 26, wherein the one or more second proposed values comprises a second proposed range of values for the TWT session indicated by a first value for the second parameter included in the second field of the first element and a second value for the second parameter included in the second field of the second element.

28. A second wireless node for wireless communications, comprising:

one or more processors configured to execute executable instructions stored on one or more memories and to cause the second wireless node to:
receive a first frame from a first wireless node, wherein:
the first frame includes a first element and a second element;
each of the first element and the second element include at least a first field that corresponds to a first parameter being negotiated with the first wireless node for a target wake time (TWT) session;
each of the first element and the second element include at least a second field that corresponds to a second parameter being negotiated with the first wireless node for the TWT session; and
the first frame indicates:
one or more first proposed values for the first parameter for the TWT session; and
one or more second proposed values for the second parameter for the TWT session.

29. The second wireless node of claim 28, wherein the one or more first proposed values comprises a first proposed range of values for the TWT session indicated by a first value for the first parameter included in the first field of the first element and a second value for the first parameter included in the first field of the second element.

30. The second wireless node of claim 29, wherein the one or more second proposed values comprises a second proposed range of values for the TWT session indicated by a first value for the second parameter included in the second field of the first element and a second value for the second parameter included in the second field of the second element.

* * * * *